(12) United States Patent
Mason

(10) Patent No.: US 10,107,436 B2
(45) Date of Patent: Oct. 23, 2018

(54) METHOD OF BONDING A BRACKET TO A LIGHTING COLUMN

(71) Applicant: The Aluminium Lighting Company Ltd., Port Talbot (GB)

(72) Inventor: Paul Mason, Port Talbot (GB)

(73) Assignee: THE ALUMINIUM LIGHTING COMPANY LIMITED, Port Talbot (GB)

( * ) Notice: Subject to any disclaimer, the term of this patent is extended or adjusted under 35 U.S.C. 154(b) by 506 days.

(21) Appl. No.: 14/963,074

(22) Filed: Dec. 8, 2015

(65) Prior Publication Data

US 2016/0161054 A1  Jun. 9, 2016

(51) Int. Cl.
| | |
|---|---|
| *F21V 21/108* | (2006.01) |
| *F16L 41/08* | (2006.01) |
| *F16B 11/00* | (2006.01) |
| *E04H 12/24* | (2006.01) |
| *F21V 21/00* | (2006.01) |

(52) U.S. Cl.
CPC ............ *F16L 41/082* (2013.01); *E04H 12/24* (2013.01); *F16B 11/008* (2013.01); *F21V 21/00* (2013.01); *F21V 21/108* (2013.01)

(58) Field of Classification Search
CPC .............................. F21V 21/00; F21V 21/108
USPC .................................................. 156/293, 294
See application file for complete search history.

(56) References Cited

U.S. PATENT DOCUMENTS

| 6,685,154 B1 * | 2/2004 | Blyth | ..................... E01F 9/696 248/219.1 |
| 8,590,654 B2 * | 11/2013 | Kerner | ................... B60K 28/00 180/190 |

FOREIGN PATENT DOCUMENTS

NL          8002769 A     12/1981

* cited by examiner

*Primary Examiner* — Jeffry H Aftergut
(74) *Attorney, Agent, or Firm* — AEON Law, PLLC; Adam L. K. Philipp; David V. H. Cohen

(57) ABSTRACT

A method of securing a bracket arm to a cast section of a bracket for securement to inter alia a lighting column. The cast section comprises a main body and one or more extension sections extending from the main body. Each extension section has a lesser dimension than the main body such that a step is formed at the junction between the extension section and the main body and the distal end of the or each extension section has a concentric lip. The method comprises the steps of mounting the or each bracket arm over and along an associated extension section such that one end of the mounting arm abuts the step thereby providing a closed cavity bounded by the extension section, arm, step and lip; injecting structural adhesive through an aperture extending into the cavity; and allowing the adhesive to cure within the cavity.

5 Claims, 2 Drawing Sheets

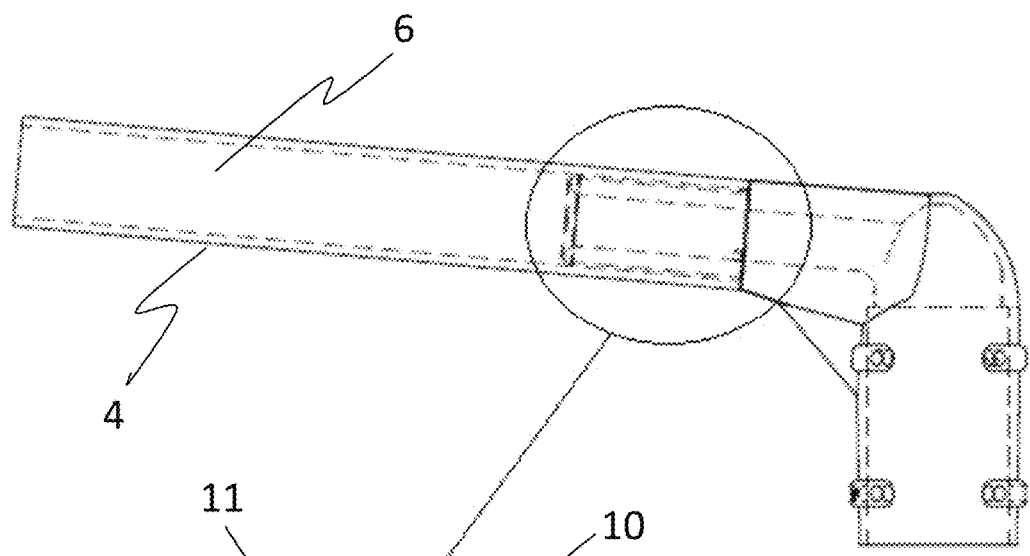
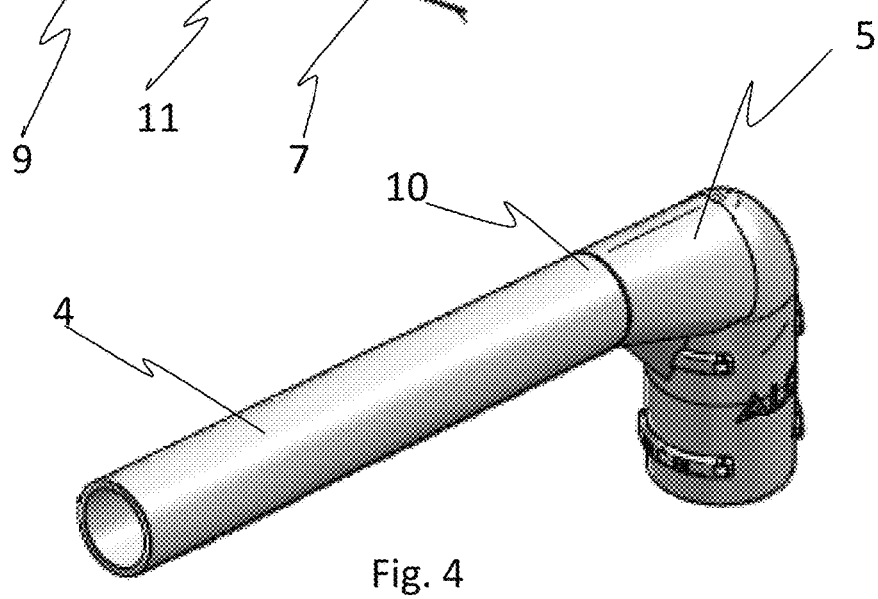
Fig. 3
Fig. 4

METHOD OF BONDING A BRACKET TO A LIGHTING COLUMN

FIELD OF THE INVENTION

The present invention relates to a method of bonding a bracket to a column, for example a lighting column. Specifically, the invention relates to a method of securing a bracket to the top of a column and more especially to a method of securing a bracket arm onto a cast section.

BACKGROUND TO THE INVENTION

Conventionally, lighting columns, comprising generally of aluminium tubes, are secured in use to a ground anchored flange plate.

The top of the column typically has a bracket (usually a single or double bracket) or spigot secured thereto.

A retrofit bracket includes, for example, one or more bracket arms bonded to a cast section which is itself secured to the top of the lighting column. The or each bracket arm is generally formed as an aluminium tube and is fitted over an appropriate end of the casting and welded in place.

Recent surveys and tests have established major concerns over failure caused by fatigue at the weld. High bending moments occur at the bracket exerting considerable stress at the weld.

Moreover, the act of welding results in heat affected zones at the juncture of the bracket arm and cast which can reduce the mechanical properties of aluminium by up to 50%.

Furthermore, the likelihood of fatigue is increased at points where two different metals are welded together, such as for example when aluminium bracket arms are welded to a cast section of the bracket.

The present invention relates to an improved method of securing a bracket arm to a cast section using structural adhesive.

Structural adhesives have generally not been considered for securing brackets and similar components to lighting columns because the adhesive cannot support the weight of the components without support, even when they are held in a jig, and insufficient support may result in a non-uniform layer of adhesive between the substrates.

The present invention seeks to alleviate this problem by providing a recess with boundaries to enable control of the flow of adhesive within the recess thereby to ensure that an even and uniform layer of adhesive is provided across the entire joint.

STATEMENT OF INVENTION

According to a first aspect of the invention there is provided a bracket for inter alia a lighting column, the bracket having a generally tubular main body to which at least one tubular bracket arm is secured, the main body having a first section secured in use to the top of the lighting column and at least one extension section extending from the main body to which the or each bracket arm is secured, wherein each extension section has a lesser dimension than the main body thereby to provide a step at the junction between the extension section and the main body, the distal end of the or each extension section having a concentric lip, wherein the or each bracket arm is located over and along its associated extension section such that one end of the arm abuts the step, thereby forming a closed cavity bounded by the extension section, bracket arm, step and lip.

Preferably an aperture is formed through the arm and extension section into the cavity. Preferably still a metal conductor is received within the aperture.

According to a second aspect of the invention there is provided a method of securing a bracket arm to a cast section of a bracket for securement to inter alia a lighting column the cast section having a main body and one or more extension sections extending from the main body each extension section having a lesser dimension than the main body such that a step is formed at the junction between the extension section and the main body and the distal end of the or each extension section having a concentric lip; the method comprising the steps of:

mounting the or each bracket arm over and along an associated extension section such that one end of the mounting arm abuts the step thereby providing a closed cavity bounded by the extension section, arm, step and lip;
   injecting structural adhesive through an aperture extending into the cavity; and
   allowing the adhesive to cure within the cavity.

The method may further comprises the steps of:
   drilling through said aperture to provide a bore between the bracket arm and extension section; and
   placing a metal conductor through the bore to electrically connect the bracket arm to the extension section.

BRIEF DESCRIPTION OF THE DRAWINGS

One embodiment of the invention will now be described by way of example only, with reference to the accompanying figures in which:

FIG. 3 is a cross-section view of the single bracket of FIG. 1 with the bracket arm secured in place; and FIG. 4 is a perspective view of the bracket of FIG. 3.

DETAILED DESCRIPTION OF PREFERRED EMBODIMENTS

Figure 1:
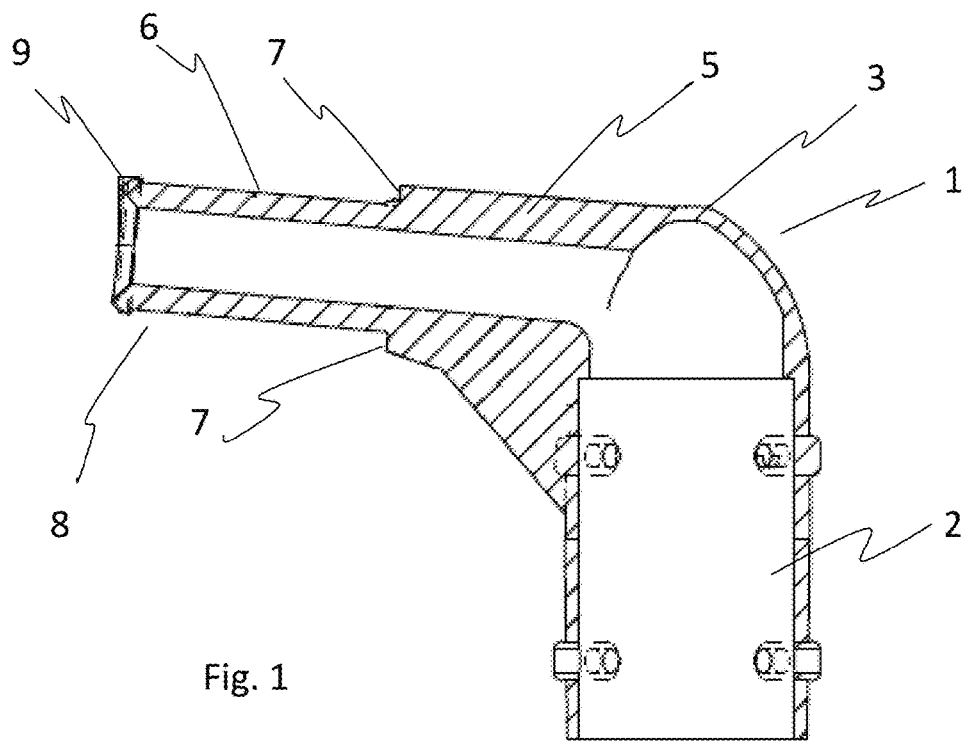
FIG. 1 is a cross-section view of a single bracket for a lighting column construction according to the invention.

FIG. 1 illustrates a single retrofit bracket 1 for a lighting column 2. The bracket 1 comprises a generally tubular cast 3 and at least one bracket arm 4 (the arm 4 is not shown in FIGS. 1 and 2 but can be seen in FIGS. 3 and 4). The cast 3 is securely mounted onto the end of the lighting column 2.

The cast 3 comprises a main body 5 and an extension section 6 extending from the main body 5. The diameter of the extension section 6 is less than that of the main body 5 such that a step 7 is formed at the juncture between the extension section 6 and the main body 5.

The distal end 8 of the extension section includes a concentric 9.

In use, as can be seen best in the FIG. 3, the bracket arm 4 is secured over and along the extension section 6. The diameter of the bracket arm 4 is greater than that of the extension section 6 but less than that of the main body 5. Consequently, one end 10 of the bracket arm 4 abuts the step 7 once the bracket arm 4 is in place over the extension section 6.

When the bracket arm 4 is located on the bracket 3, a closed cavity 11 is formed between the inside surface (shown in dotted lines) of the bracket arm 4 and the outer surface (also shown in dotted lines) of the extension section 6. One end of the cavity 11 is closed by the step 7 and the other end of the cavity 11 is closed by the lip 9.

The method of securing the bracket arm 4 to the bracket body 5 and bonding it in place will now be described.

Once the bracket arm 4 is located in place over the extension section, an aperture is drilled through the bracket arm 4 and into the cavity 11. The aperture may be pre-drilled prior to the arm being placed over the section.

An adhesive is then injected through the aperture and into the cavity 11.

The adhesive a structural adhesive for example, a modified acrylic adhesive. When choosing a suitable structural adhesive, one must consider an adhesive with a sheer strength appropriate to the size of the assembly.

As the volume of the cavity can be defined, the precise amount of adhesive needed to fill that volume can be calculated and administered. The lip 9 and step 7 provide seals between the arm 4 and the section 6 to retain the adhesive within the cavity 11 and prevent the adhesive diluting through the assembly thereby causing an uneven non-uniform layer around the joint.

The method of the present invention ensures that the quantity and flow of adhesive can be carefully controlled to ensure that an uneven and uniform layer of adhesive is formed across the entire joint.

The closed cavity 11 has been found to create a partial vacuum within the assembly assisting the flow of adhesive particularly through a larger diameter joint.

Once the adhesive cured, the aperture is drilled through once again, the drill this time extending into the wall of the extension section 6 of the bracket 3. A metal conductor, for example a steel pin, is then placed through the aperture to provide an electrical connection between the arm 4 and the bracket 3 thereby to provide electrical continuity through the entire column 2.

Figure 2:
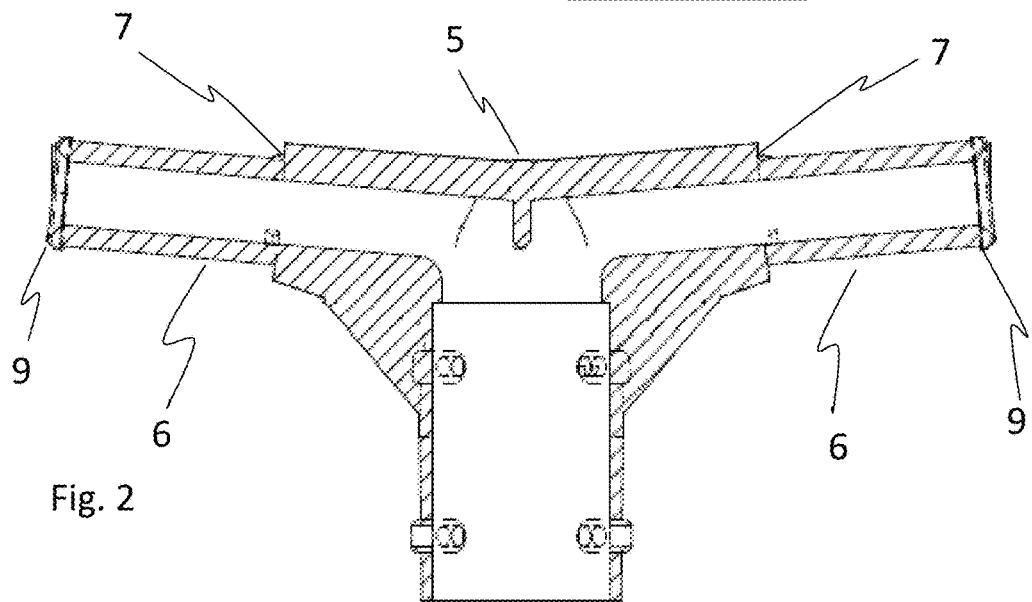
FIG. 2 is a cross-section view of a double bracket for a lighting column construction in accordance with the invention.

FIG. 2 shows the same principle but this time through a double bracket. In this case, two bracket arms 4 extend from either side of the main bracket body 5 and are bonded in place in accordance with the method described above.

It will be appreciated that the foregoing are merely an example of embodiments and lust some examples of the method used to construct the embodiments. The skilled reader will readily understand that modifications can be made thereto without departing from the true scope of the invention.

The invention claimed is:

1. A method of securing a bracket arm to a cast section of a bracket for securement to inter alia a lighting column the cast section having a main body and one or more extension sections extending from the main body each extension section having a lesser dimension than the main body such that a step is formed at the junction between the extension section and the main body and the distal end of the or each extension section having a concentric lip; the method comprising the steps of:
   mounting the or each bracket arm over and along an associated extension section such that one end of the mounting arm abuts the step thereby providing a closed cavity bounded by the extension section, arm, step and lip;
   injecting structural adhesive through an aperture extending into the cavity; and
   allowing the adhesive to cure within the cavity.

2. A method as claimed in claim 1 further comprising the steps of:
   drilling through said aperture to provide a bore between the bracket arm and extension section; and
   placing a metal conductor through the bore to electrically connect the bracket arm to the extension section.

3. A lighting column bracket, the bracket having a generally tubular main body to which at least one tubular bracket arm is secured, the main body having a first section secured in use to the top of the lighting column and at least one extension section extending from the main body to which the or each bracket arm is secured, wherein each extension section has a lesser dimension than the main body thereby to provide a step at the junction between the extension section and the main body, the distal end of the or each extension section having a concentric lip, wherein the or each bracket arm is located over and along its associated extension section such that one end of the arm abuts the step, thereby forming a closed cavity bounded by the extension section, bracket arm, step and lip.

4. A bracket as claimed in claim 3 wherein an aperture is formed through the arm and extension section into the cavity.

5. A bracket as claimed in claim 4 wherein a metal conductor is received within the aperture.

\* \* \* \* \*